UNITED STATES PATENT OFFICE.

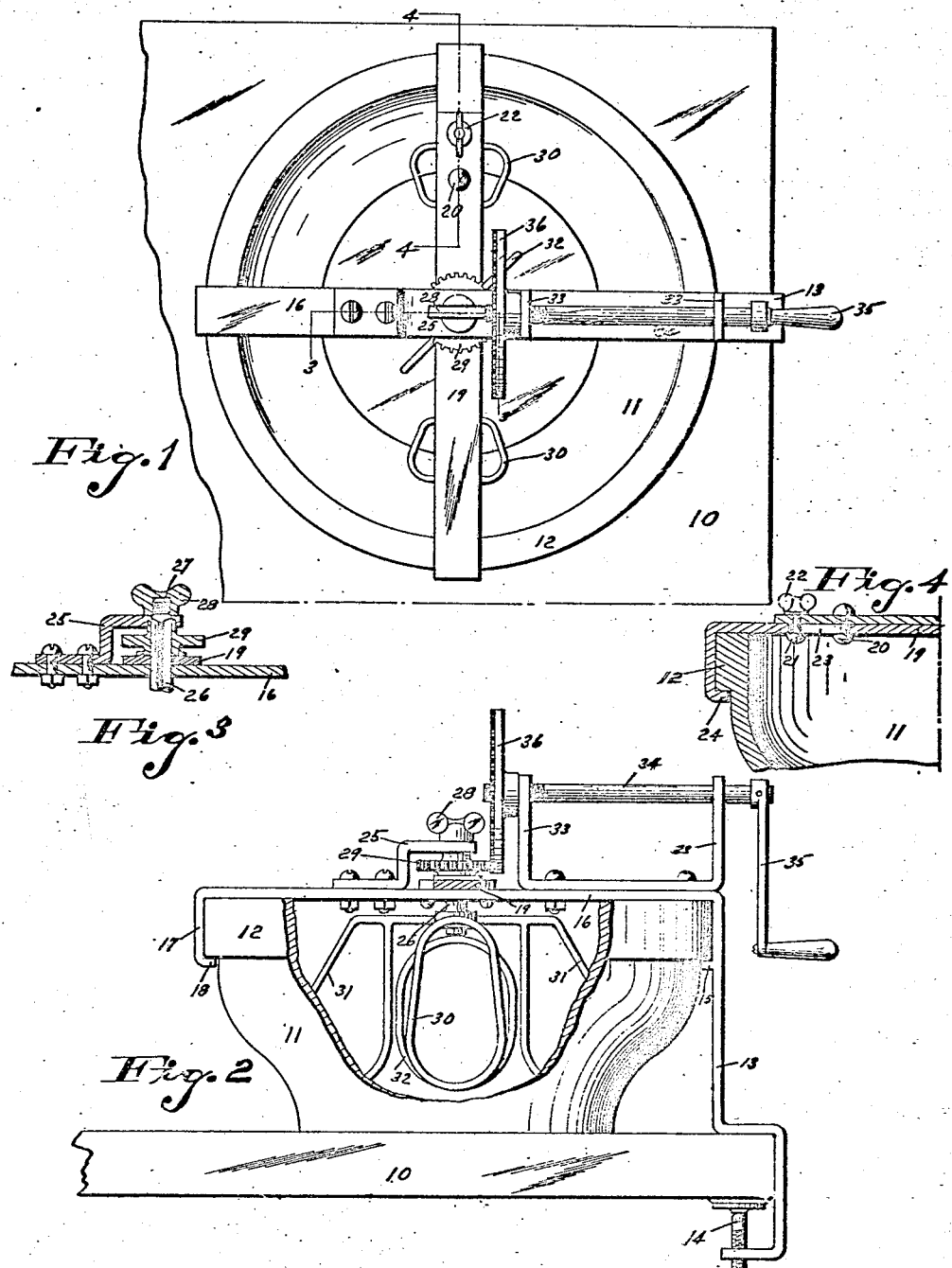

ADA TOMLINSON, OF CAMBRIDGE, IOWA.

CAKE-MIXER.

No. 895,315.  Specification of Letters Patent.  Patented Aug. 4, 1908.

Application filed July 23, 1907. Serial No. 385,173.

*To all whom it may concern:*

Be it known that I, ADA TOMLINSON, a citizen of the United States, residing at Cambridge, in the county of Story and State of Iowa, have invented a certain new and useful Cake-Mixer, of which the following is a specification.

The object of my invention is to provide a cake mixer of simple, durable and inexpensive construction, designed to be placed upon a suitable vessel, and also to be connected to the vessel and to a table top or other support upon which the vessel is resting, so that the operation of turning the beaters will not tend to upset the vessel.

A further object is to provide improved means for detachably connecting the device with a vessel and table top, and also to provide a device of this kind in which the operative parts may be quickly and easily detached for purposes of cleaning.

My invention consists in the construction, arrangement and combination of the various parts of the device, whereby the objects contemplated are attained, as hereinafter more fully set forth, pointed out in my claim and illustrated in the accompanying drawings, in which—

Figure 1 shows a top or plan view of a device embodying my invention applied to a vessel and to a table top. Fig. 2 shows a side elevation of same, with part of the vessel broken away. Fig. 3 shows a detail sectional view illustrating the means for detachably connecting the beater shaft with the gear wheel, taken on the line 3—3 of Fig. 1, and Fig. 4 shows a detail sectional view illustrating one of the adjustable supports for the device, taken on the line 4—4 of Fig. 1.

Referring to the accompanying drawings, I have used the reference numeral 10 to indicate the table top, and 11 a vessel having a rim or flange 12 around its top. The frame of the device comprises an upright 13 having its lower portion shaped to pass around under a table top, and provided with a set screw 14 designed to engage the under surface of a table top. Near the upper end of the upright 13 is a lug 15 designed to pass under the rim 12. At the upper end of the upright 13 is a horizontal frame member 16 designed to extend across the top of the vessel and having at its opposite side a downwardly projecting portion 17 with a lug 18 thereon designed to pass under the rim 12. I first clamp the upright to the table top, then place the vessel on the table top and slide it under the horizontal frame member 16 so that the lugs 15 and 18 may enter under the rim 12 to brace the device against lateral movement relative to the vessel. I provide a second horizontal frame member 19 made of two overlapping parts connected by means of a rivet 20, and a bolt 21, the latter having a thumb nut 22 thereon, said rivet and said bolt being extended through one of the members 19 and through a slot 23 in the other member. Each of the members 19 is provided with a lug 24 to pass under the rim 12.

On top of the frame member 16 is a bracket 25, and extended upwardly through the frame members 16 and 19, and through the bracket 25 is the beater shaft 26, which is preferably rectangular in cross section and provided at its top with a screw threaded extension 27, on which is a thumb nut 28. This shaft serves to connect the frame members 16 and 19, and mounted on it between the bracket 25 and the frame member 19 is a pinion 29 having the upper portion of its hub inserted in a recess in the bracket 25, and the lower portion of its hub inserted in a recess in the frame member 19 so that when the shaft 26 is removed, this pinion will remain in place.

On the lower end of the beater shaft are the beaters proper of which two on opposite sides are made of wire loops, which incline outwardly and downwardly, and which have their sides at right angles to a radial line from the shaft. These two beaters are indicated by the numeral 30. Arranged between the beater members 30 are two beater members 31, each formed of a wire loop, the sides of which are arranged in line radially from the shaft 26, and directly below the center of the shaft 26 is a central beater member 32, also formed of a wire loop. By thus arranging the beater members, they are prevented from following one in the path of the other, and hence will more thoroughly agitate the material within the vessel than would be the case if the beater members were all of the same kind and arranged in the same manner.

I provide for rotating the beater shaft as follows: On top of the frame member 16 is a bracket 33 having a shaft 34 therein, provided on one end with a crank 35, and on its other end with the pinion 36 normally in mesh with the pinion 29.

In practical use, I first secure the upright to the table top, then place the vessel in position with its rim engaged by the lugs 15 and 18. I then adjust the frame members 19 so that their lugs 24 engage the rim 12. I then turn the crank 35 and thus rotate the agitator shaft carrying the agitators. If it is desired to detach the parts for purposes of cleaning or shipping, I remove the thumb nut 28 then slip the beater shaft downwardly out of engagement with the frame members 16 and 19, then the frame member 19 may be turned to position parallel with the frame member 16, and the whole device will occupy a minimum of space, and all of the parts may be readily and easily cleaned.

Having thus described my invention, what I claim and desire to secure by Letters Patent of the United States, therefor, is—

A cake mixer comprising a frame consisting of a frame member having a horizontal body portion designed to extend across the top of a vessel, and having at one end a downward extension, with its lower end inclined inwardly to overlap the rim of a vessel, and having at its other end a downwardly projecting portion provided with a lug to project under the rim of a vessel, and an outwardly extending portion to rest upon a table on which the vessel is resting, and a part to extend under the table, a set screw therein for clamping the frame member to a table, a bracket mounted upon the horizontal part of said frame member, a shaft mounted therein, a pinion on the shaft, a beater comprising a number of loops arranged and constructed substantially as set forth, a shaft connected with said loops and extended upwardly through the central portion of said frame member, a bracket fixed to said frame member and designed to receive the upper end of said shaft, a pinion detachably mounted on said shaft and inserted between the bracket and the body portion, a nut on top of the shaft, said parts being so arranged that when the nut is detached, the shaft may be withdrawn downwardly through the pinion and frame member, said pinion being in mesh with the aforesaid pinion, and a second frame member comprising a flat body portion arranged at right angles to the aforesaid frame member, and having at each end a downwardly and inwardly extended portion to engage the rim of a vessel, said horizontal part also being adjustable longitudinally for the purposes stated.

Des Moines, Iowa, July 9, 1907.

ADA TOMLINSON.

Witnesses:
L. H. SHERVEN,
W. R. CURTIS.